C. S. TRASK,
Assignor to THE NATIONAL SPINDLE STEP COMPANY.
SPINDLE STEP.
No. 10,840. Reissued May 31, 1887.
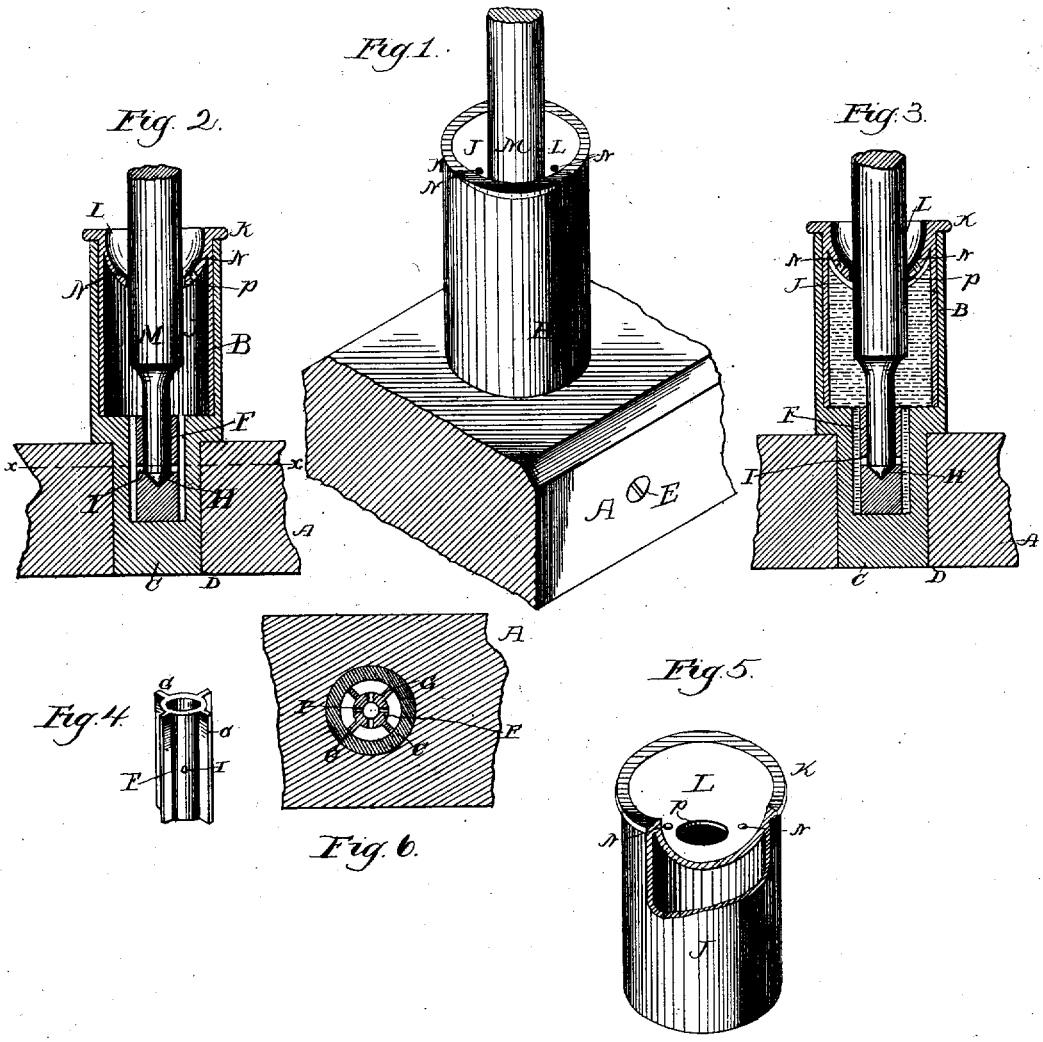
Witnesses.
Jas. J. Maloney.
H. P. Bates.
Inventor.
Clarence S. Trask.
by Jos. P. Livermore
Atty.
N. PETERS, Photo-Lithographer, Washington, D. C.

UNITED STATES PATENT OFFICE.

CLARENCE S. TRASK, OF LOWELL, ASSIGNOR TO THE NATIONAL SPINDLE STEP COMPANY, OF BOSTON, MASSACHUSETTS.

SPINDLE-STEP.

SPECIFICATION forming part of Reissued Letters Patent No. 10,840, dated May 31, 1887.

Original No. 340,018, dated April 13, 1886. Application for reissue filed July 23, 1886. Serial No. 208,881.

*To all whom it may concern:*

Be it known that I, CLARENCE S. TRASK, a citizen of the United States, and a resident of Lowell, in the county of Middlesex and State of Massachusetts, have invented certain new and useful Improvements in Spindle-Steps; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved spindle-step, showing the same in position upon the frame-rail ready for operation, only the lower end of the spindle and only a portion of the frame-rail being shown. Fig. 2 is a vertical sectional view of the same. Fig. 3 is a vertical sectional view of the same, showing the spindle-case filled with oil and illustrating the position assumed by the oil when the spindle is in operation. Fig. 4 is a perspective view of the flanged bearing or step for the lower end of the spindle detached from the case. Fig. 5 is a horizontal sectional view taken on the line *x x* in Fig. 2; and Fig. 6 is a perspective view of the interior case removed from the step-box, parts of the same having been broken away for the purpose of illustrating the construction more clearly.

The same letters refer to the same parts in all the figures.

This invention relates to spindle-steps for spinning-frames; and it has for its object to provide a device of this class which shall possess superior advantages in point of simplicity, durability, and general efficiency, which shall have capacity for receiving lubricating material in sufficient quantity for the spindle to run for a long period without refilling, and which shall be so constructed as to prevent the oil from escaping or from ascending the spindle, which would be obviously objectionable.

With these ends in view the invention consists in the improved construction, arrangement, and combination of parts, which will be hereinafter fully described, and particularly pointed out in the claims.

In the drawings hereto annexed, A designates the rail of the spinning-frame, in which the step-box B is mounted by means of its downwardly-extending projection C, which enters a socket, D, in the rail, where it is retained by means of a screw, E, inserted from the side of the latter. The step-box B is preferably of a cylindrical shape. The projection C is provided with a recess extending nearly to its bottom, in which is placed the block F, which is also recessed nearly to its bottom, forming a step or bearing, H, for the lower end of the spindle. This block F is provided with vertical flanges G, which fit in the recess in the projection C tightly enough to keep it from turning with the spindle. These flanges also form channels for the oil to pass down from the upper part of the step-box.

Between each of the flanges G, directly above the bottom of the bearing, is a horizontal perforation, I, through which the oil passes from the spaces between the flanges to the step H.

The spindle-case J is a shell fitting within the step-box B, and provided at the top with a concave or cup-shaped cover, L, having a flange, K, and a central perforation, P, through which the spindle passes, which perforation or opening P is somewhat larger in diameter than the portion of the spindle within it, so that the spindle when in operation never comes in contact with the cup-shaped cover. This cover is also provided with two perforations, N N, the purpose of which will be hereinafter explained.

In operation the case J and the spindle are placed in position, and the spindle-case is then filled with oil about to the level of the lower edge of the cup or flange L. The oil will fill the spaces between the flanges G and pass through the perforations I to the bearing at the lower end of the spindle, which is thus kept freely supplied with oil.

In operation the oil contained in the case will, by the centrifugal action of the spindle, be thrown or forced in an outward direction against the walls of the case, rising upward along the outer walls of the case J, as shown in Fig. 3 of the drawings, but not sufficiently far to reach the under side of the cover L. The centrifugal force also throws the air which is upon the upper surface of the oil outward, and by this action causes air to be drawn in through the opening P, passing downward along the surface of the rotating spindle, and tending to produce a slight pressure in the spindle-case upon the surface of the oil. The perforations N, which are at an intermediate point between the central opening, P, and the outer edge of the cover, relieve this pressure of the air in the chamber and permit the air to escape therefrom, and by the arrangement, shape, and proportions of the cover L and perforations P and N therein a constant circulation of air is maintained while the spindle is in operation, the air passing downward through the opening P, around the spindle, and upward through the openings N into the hollow of the cover L. This wholly prevents the pumping or lifting of the oil out from the receptacle while the spindle is running.

The general construction is simple, and the oil-retaining capacity is so great that the device may run for a very considerable period without attention.

Having thus described my invention, I claim and desire to secure by Letters Patent of the United States—

1. As an improvement in spindle steps, the combination of a step-box having a downwardly-extending projection, a cylindrical bearing-block arranged in a socket in said projection, and having exterior vertical flanges fitting tightly in the latter and horizontal perforations arranged between the flanges and directly above the bottom of the step or bearing, and an inner case fitted in the step-box, and provided at its upper edge with a downwardly and inwardly extending annular concave flange or cup provided with openings or perforations, all arranged and operating substantially as and for the purpose herein set forth.

2. The combination, with a spindle, of a step and a step-box forming an oil-chamber around the spindle, the said step-box or chamber having a concave cup-shaped cover highest at its outer edge, with a central opening of larger diameter than the spindle, through which the spindle passes, and perforations at an intermediate point between the said central opening and the outer edge or highest part of the cover, substantially as and for the purpose described.

3. The combination, with a spindle, of a step and a step-box forming an oil-chamber around the spindle, the said step-box or chamber having a concave cup-shaped cover highest at its outer edge, with a central opening of larger diameter than the spindle, through which the spindle passes, the upper concave side of said cover being open to the atmosphere, substantially as and for the purpose described.

In testimony whereof I have signed my name to this specification in the presence of two subscribing witnesses.

CLARENCE S. TRASK.

Witnesses:

H. P. BATES,

JOS. P. LIVERMORE.